United States Patent
Sakano et al.

(10) Patent No.: US 8,091,136 B2
(45) Date of Patent: Jan. 3, 2012

(54) PACKET TRANSFER DEVICE, PACKET TRANSFER METHOD, AND PROGRAM

(75) Inventors: Toshikazu Sakano, Zushi (JP); Takanori Mizuguchi, Setagaya-ku (JP); Haruhiko Nishida, Nerima-ku (JP)

(73) Assignee: NTT Communications Corporation, Tokyo (JP)

( * ) Notice: Subject to any disclaimer, the term of this patent is extended or adjusted under 35 U.S.C. 154(b) by 586 days.

(21) Appl. No.: 12/294,095

(22) PCT Filed: Mar. 22, 2007

(86) PCT No.: PCT/JP2007/055893
§ 371 (c)(1),
(2), (4) Date: Sep. 23, 2008

(87) PCT Pub. No.: WO2007/119491
PCT Pub. Date: Oct. 25, 2007

(65) Prior Publication Data
US 2009/0126004 A1    May 14, 2009

(30) Foreign Application Priority Data
Mar. 23, 2006    (JP) .................. 2006-081588

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G01R 31/08 | (2006.01) |
| G08C 15/00 | (2006.01) |
| H04J 1/16 | (2006.01) |
| H04J 3/14 | (2006.01) |
| H04L 1/00 | (2006.01) |
| H04L 12/28 | (2006.01) |

(52) U.S. Cl. .................................. 726/24; 370/229
(58) Field of Classification Search ............. 726/22–25; 370/229–240
See application file for complete search history.

(56) References Cited

U.S. PATENT DOCUMENTS

| | | | |
|---|---|---|---|
| 7,079,537 B1* | 7/2006 | Kanuri et al. ............... 370/392 |
| 7,254,639 B1* | 8/2007 | Siegel et al. ................ 709/238 |
| 7,424,744 B1* | 9/2008 | Wu et al. ..................... 726/23 |
| 7,493,659 B1* | 2/2009 | Wu et al. ..................... 726/26 |
| 7,529,242 B1* | 5/2009 | Lyle ............................. 370/392 |
| 7,609,629 B2* | 10/2009 | Watanabe et al. .......... 370/230 |
| 7,620,046 B2* | 11/2009 | Ronciak et al. ............. 370/392 |
| 7,808,897 B1* | 10/2010 | Mehta et al. ................ 370/230 |
| 2003/0202510 A1* | 10/2003 | Witkowski et al. ......... 370/386 |

(Continued)

FOREIGN PATENT DOCUMENTS
JP    2004 320453    11/2004

(Continued)

*Primary Examiner* — Christian Laforgia
(74) *Attorney, Agent, or Firm* — Oblon, Spivak, McClelland, Maier & Neustadt, L.L.P.

(57) ABSTRACT

A packet transfer apparatus is provided with: storage means configured to store a predetermined search pattern and an address identifying a predetermined apparatus; determination means configured to determine whether predetermined data in a packet received from a network interface matches the search pattern; determination means configured to determine a network interface for outputting the packet using the determination result; replacement means configured to replace an address identifying a destination apparatus of the packet with an address identifying the predetermined apparatus when outputting the packet from a network interface connected to the predetermined apparatus; and packet sending means configured to send the packet to the determined network interface.

6 Claims, 14 Drawing Sheets

U.S. PATENT DOCUMENTS

| | | | |
|---|---|---|---|
| 2003/0202520 A1* | 10/2003 | Witkowski et al. | 370/400 |
| 2004/0030766 A1* | 2/2004 | Witkowski | 709/223 |
| 2005/0152354 A1* | 7/2005 | Abel et al. | 370/389 |
| 2006/0002292 A1 | 1/2006 | Chang et al. | |
| 2006/0002386 A1 | 1/2006 | Yik et al. | |
| 2006/0159088 A1* | 7/2006 | Aghvami et al. | 370/389 |
| 2007/0047583 A1* | 3/2007 | Assa et al. | 370/471 |
| 2007/0195773 A1* | 8/2007 | Tatar et al. | 370/392 |
| 2007/0195777 A1* | 8/2007 | Tatar et al. | 370/392 |
| 2007/0195778 A1* | 8/2007 | Tatar et al. | 370/392 |
| 2008/0117913 A1* | 5/2008 | Tatar et al. | 370/392 |
| 2009/0217369 A1* | 8/2009 | Abeni et al. | 726/13 |

FOREIGN PATENT DOCUMENTS

| | | |
|---|---|---|
| JP | 2006 20318 | 1/2006 |
| JP | 2006 67078 | 3/2006 |
| WO | WO 2006/117013 A1 * | 9/2006 |

\* cited by examiner

PACKET TRANSFER DEVICE, PACKET TRANSFER METHOD, AND PROGRAM

TECHNICAL FIELD

The present invention relates to a packet transfer apparatus for transferring a packet received via a communication network to another apparatus.

BACKGROUND ART

Obstruction accesses are increasing such as an attack in which a plurality of computers distributed in a network transmit packets to a specific server in unison so as to flood communication routes and stop the functions. As a technique to prevent such an obstruction access, there is a harmful packet removal apparatus. For example, the harmful packet removal apparatus includes a function for receiving a packet addressed to a specific server, determining whether the packet is a harmful packet for attacking, and transferring only a packet other than the harmful packet.

For example, in a case where a service provider provides a network access service to a customer such as an ISP (Internet service provider) based on a network configuration shown in FIG. 1 and harmful traffic is distributed to a network apparatus such as a server in the customer network via a network of the service provider, harmful packets can be removed in the service provider side by providing the harmful packet removal apparatus in the service provider side.

By the way, as an example of conventional technique related to harmful packet removal, there is a technique described in the patent document 1 for identifying and controlling an attacking flow that matches a specific bit pattern.
[Patent document 1] Japanese Laid-Open Patent application No. 2006-067078

DISCLOSURE OF THE INVENTION

Problem to be Solved by the Invention

In the conventional technique shown in FIG. 1, there are following two methods as methods using the harmful packet removal apparatus.

The first method is a method for inserting the harmful packet removal apparatus into a connection line connecting to the customer as shown in FIG. 2. However, according to this method, it is necessary to introduce the harmful packet removal apparatus for each customer so that there is a problem in that the service becomes expensive.

The second method is one as shown in FIG. 3. As shown in FIG. 3, the network of the service provider is configured by a plurality of routers, and the harmful packet removal apparatus is placed in an desired location in the network. According to the second method, routing information in the network of the service provider is rewritten for guiding a packet addressed to the customer network apparatus that is an attack target to the harmful packet removal apparatus. If a packet after passing the harmful packet removal apparatus is returned to the network as it is, the routers on the route transmit the packet back to the harmful packet removal apparatus so that the packet does not reach an intended destination. Thus, a tunnel is established from the harmful packet removal apparatus to a network of the customer so as to send packets from which harmful packets have been removed to the tunnel.

Compared with the first method, the second method has a merit in that the harmful packet removal apparatus can be shared among a plurality of customers.

However, since it becomes necessary to introduce the tunnel to the network of the customer, there is a problem in that a function for terminating the tunnel is necessary in the customer network side. For realizing termination of the tunnel without additional hardware, software processing is performed using an existing router. But, in this method, there is a case in which performance of the router is remarkable deteriorated by the processing. Therefore, it is necessary to introduce additional hardware for performing termination of the tunnel without causing the performance deterioration of the router.

In addition, in either case of realizing the tunnel termination by software or by the additional hardware, installing cost at a remote place and a continuing operation cost arise in order for the service provider to perform the operation. Further, since change of routing information is carried out, cost due to the work (operation cost, increase of possibility of accident due to work/setting errors, enlargement and deterioration of visibility of routing information and the like) occurs.

The present invention is contrived in view of the above-mentioned points, and an object of the present invention is to provide a packet transfer technique that can transmit a packet matching a predetermined condition to a particular apparatus and can return a packet received from the particular apparatus to a network without changing routing information.

Means for Solving the Problem

The above object can be achieved by a packet transfer apparatus for performing transfer of a packet that is received via a communication network, including:

a plurality of network interfaces;

storage means configured to store at least a predetermined search pattern and an address identifying a predetermined apparatus;

determination means configured to determine whether predetermined data in a packet received from a network interface matches the search pattern;

output interface determination means configured to determine a network interface for outputting the packet using the determination result by the determination means;

address replacement means configured to replace an address identifying a destination apparatus of the packet with an address identifying the predetermined apparatus when outputting the packet from a network interface connected to the predetermined apparatus; and packet sending means configured to send the packet to the network interface determined by the output interface determination means.

In the packet transfer apparatus, the output interface determination means may be configured to determine the network interface for outputting the packet based on the determination result by the determination means and the network interface from which the packet is received.

In addition, when the determination means determines that the predetermined data in the packet matches the search pattern, the output interface determination means may be configured to determine to output the packet from a network interface connected to the predetermined apparatus.

When receiving the packet from the predetermined apparatus, the packet transfer apparatus may output the packet from a network interface corresponding to a destination described in the packet without performing determination by the determination means.

When the determination means determines that the predetermined data in the packet does not match the search pattern, the output interface determination means may determine to output the packet from a predetermined network interface as corresponding to the network interface from which the packet is received.

As the address identifying the predetermined apparatus, an Ethernet address of the apparatus may be used.

In addition, the present invention may be also configured as a packet transfer method corresponding to the operation of the packet transfer apparatus, and a non-transitory computer readable storage medium that stores a program causing a computer and the like to execute processes of the packet transfer apparatus.

Effect of the Invention

According to the present invention, a packet transfer technique that can transmit a packet matching a predetermined condition to a particular apparatus and can return a packet received from the particular apparatus to a network without changing routing information can be provided.

Figure 1:
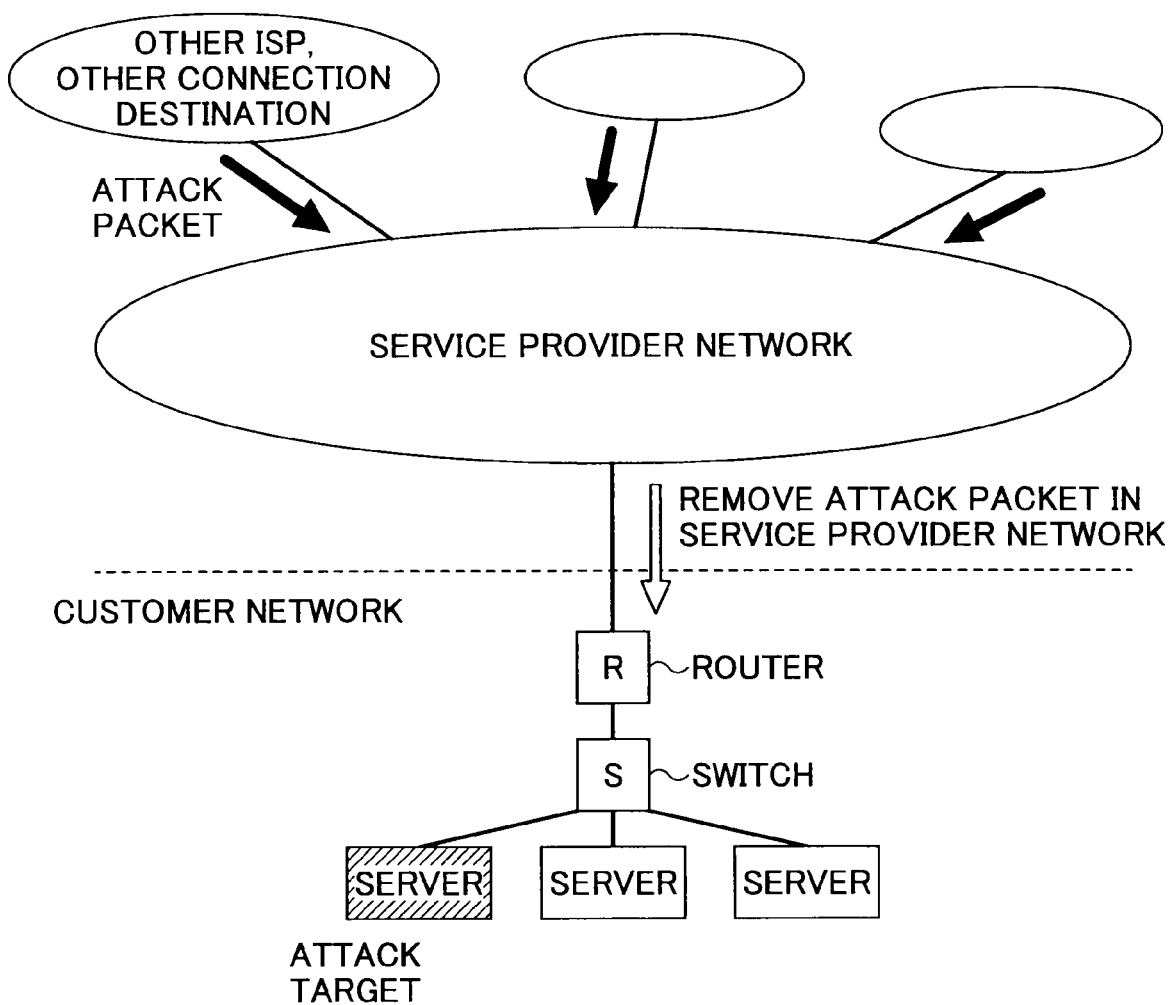
FIG. 1 is a diagram for explaining a service using a harmful packet removal apparatus.

DESCRIPTION OF REFERENCE SIGNS 10 packet transfer apparatus
30 harmful packet removal apparatus
40 upstream router
50 downstream router
11 interface
12 packet reception unit
13 pattern matching execution unit
14 output interface determination unit
15 Ethernet address replacement unit
16 packet sending unit
17 pattern setting unit
18 packet buffer
19 search pattern table
20 Ethernet address table 20
21 interface for inputting settings

PREFERRED EMBODIMENTS FOR CARRYING OUT THE INVENTION

In the following, embodiments of the present invention are described.

Figure 4:
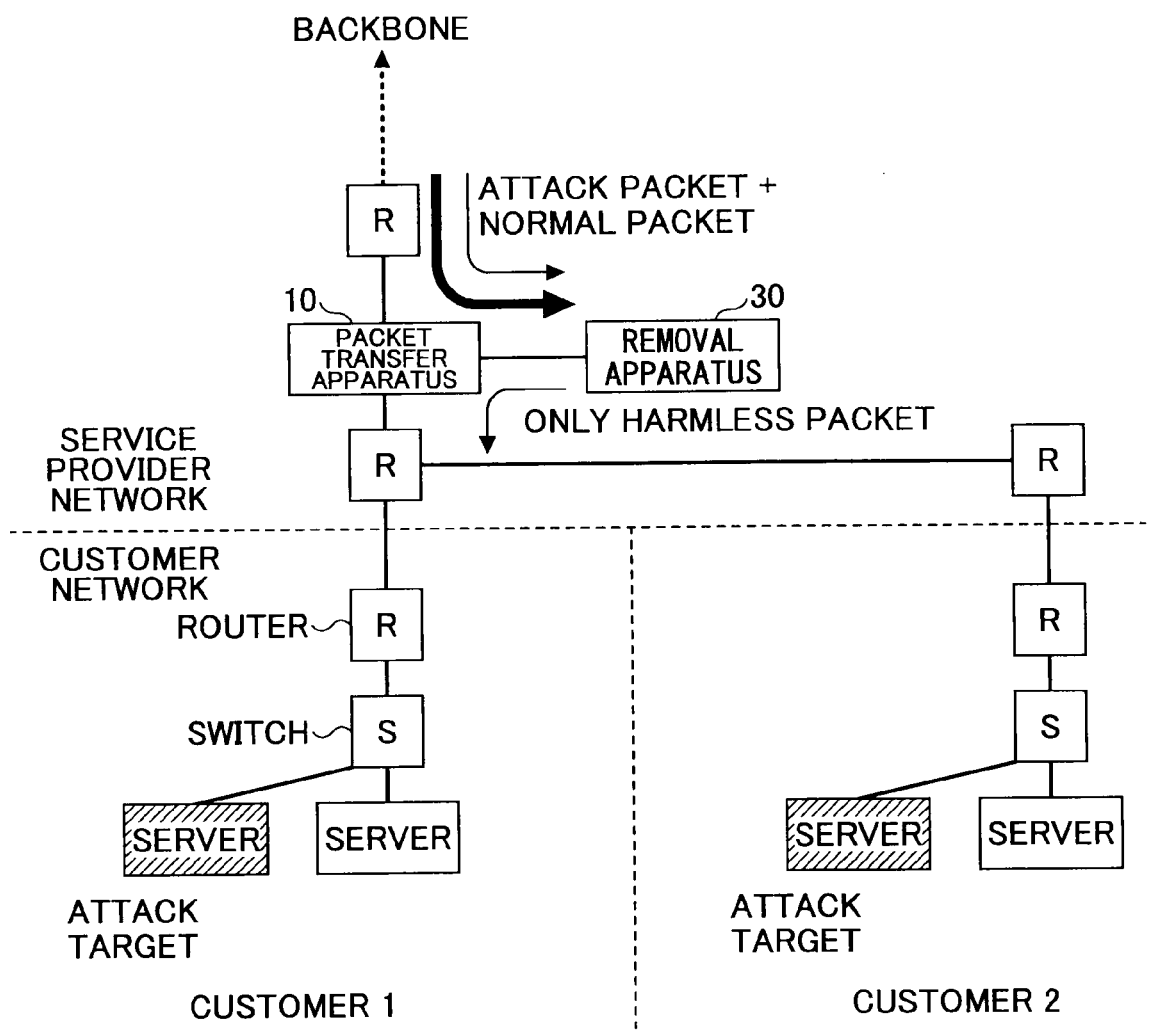
FIG. 4 is a diagram for explaining an outline of the first embodiment of the present invention.

First Embodiment (Outline)
First, an outline of the first embodiment is described. FIG. 4 shows a use example of a packet transfer apparatus 10 in the present embodiment. As shown in FIG. 4, the packet transfer apparatus 10 of the present embodiment is inserted into a location where a packet that goes toward an attack target passes. In addition, a harmful packet removal apparatus 30 is connected to the packet transfer apparatus 10 of the present embodiment. The packet transfer apparatus 10 includes functions for selecting only a packet going toward the attack target from among packets that pass through the packet transfer apparatus 10 to send the selected packet to the harmful packet removal apparatus 30, and returning a packet that has passed through the harmful packet removal apparatus 30 (that has been determined to be harmless) to a traffic going toward the attack target. In the present embodiment, the above-mentioned functions are realized without changing routing information and also without using a tunnel.

By the way, as shown in FIG. 4, generally, the network of the service provider is configured by connecting routers in a multistage manner, and the packet transfer apparatus 10 is inserted before a router that accommodates the customer. But, the packet transfer apparatus 10 need not necessarily be connected to the customer accommodating router directly.

Figure 5:
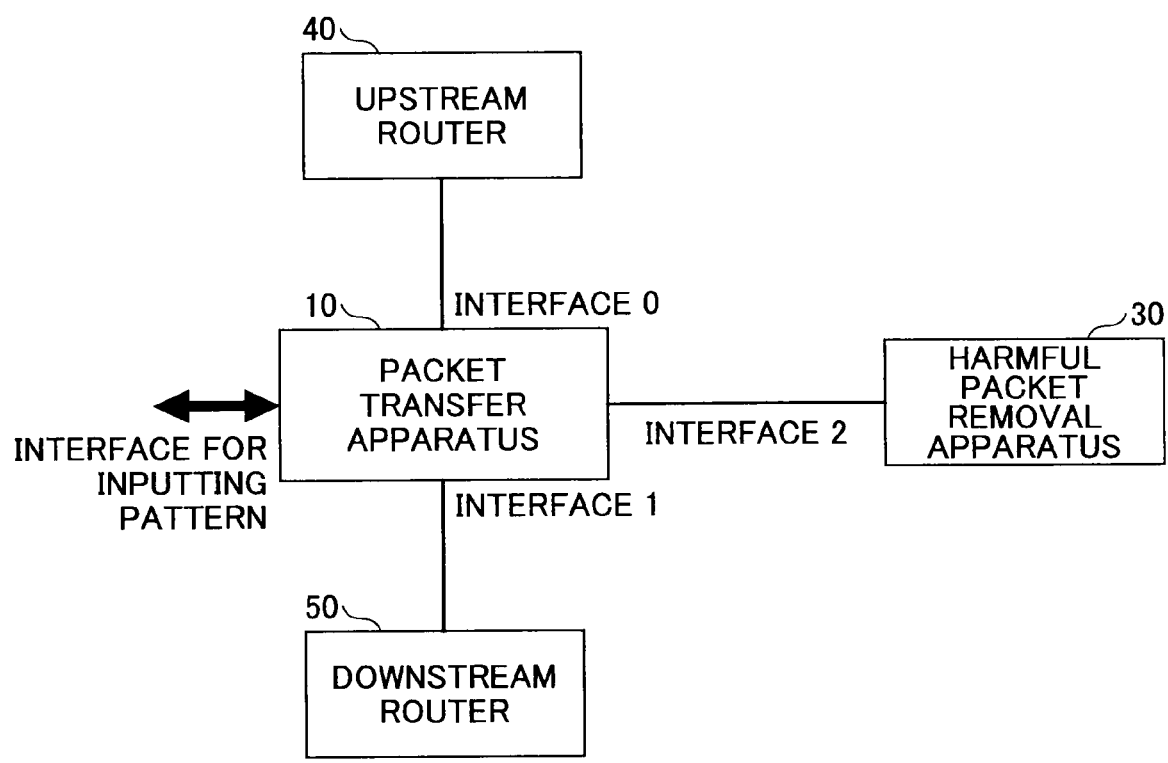
FIG. 5 is a connection configuration of a packet transfer apparatus.

FIG. 5 shows a connection configuration of the packet transfer apparatus 10. By the way, in the following descriptions, the customer accommodating router or a router in a side closer to the customer accommodating router in relation to an inserting point of the packet transfer apparatus 10 is called a downstream router, and a router in a side transmitting, toward the downstream router, packets addressed to the customer is called an upstream router.

As shown in FIG. 5, the packet transfer apparatus 10 of the present embodiment is provided with at least three network interfaces (0-2). In the example shown in FIG. 5, the interface 0 is connected to the upstream router 40, the interface 1 is connected to the downstream router 50, and the interface 2 is connected to the harmful packet removal apparatus 30.

The packet transfer apparatus 10 includes a function for performing pattern matching for an arbitrary length at an arbitrary position in a received packet, a function for determining an output interface based on an input interface that receives the packet and a result of the pattern matching, and a replacement function for replacing an Ethernet address in a header of the packet with an Ethernet address of a sending destination of the packet for obtaining conformity with a conventional network apparatus such as a switch and a router and the like. By the way, in the present embodiment, although an Ethernet address is used as an address for identifying an apparatus of the sending destination since apparatuses are connected by the Ethernet, it is only necessary to use an address according to a type of a network in which layer 2 packet transfer is performed.

By the way, the Ethernet is a standard used for exchanging packets between IP network apparatuses such as routers, and the packet includes in its inside Ethernet addresses of a destination and a source. The destination/source Ethernet addresses are different from a destination IP address in an IP packet in the packet. In the present specification, when "destination address" is simply described, it indicates a destination IP address.

(Detailed Configuration of Apparatus)

Figure 6:
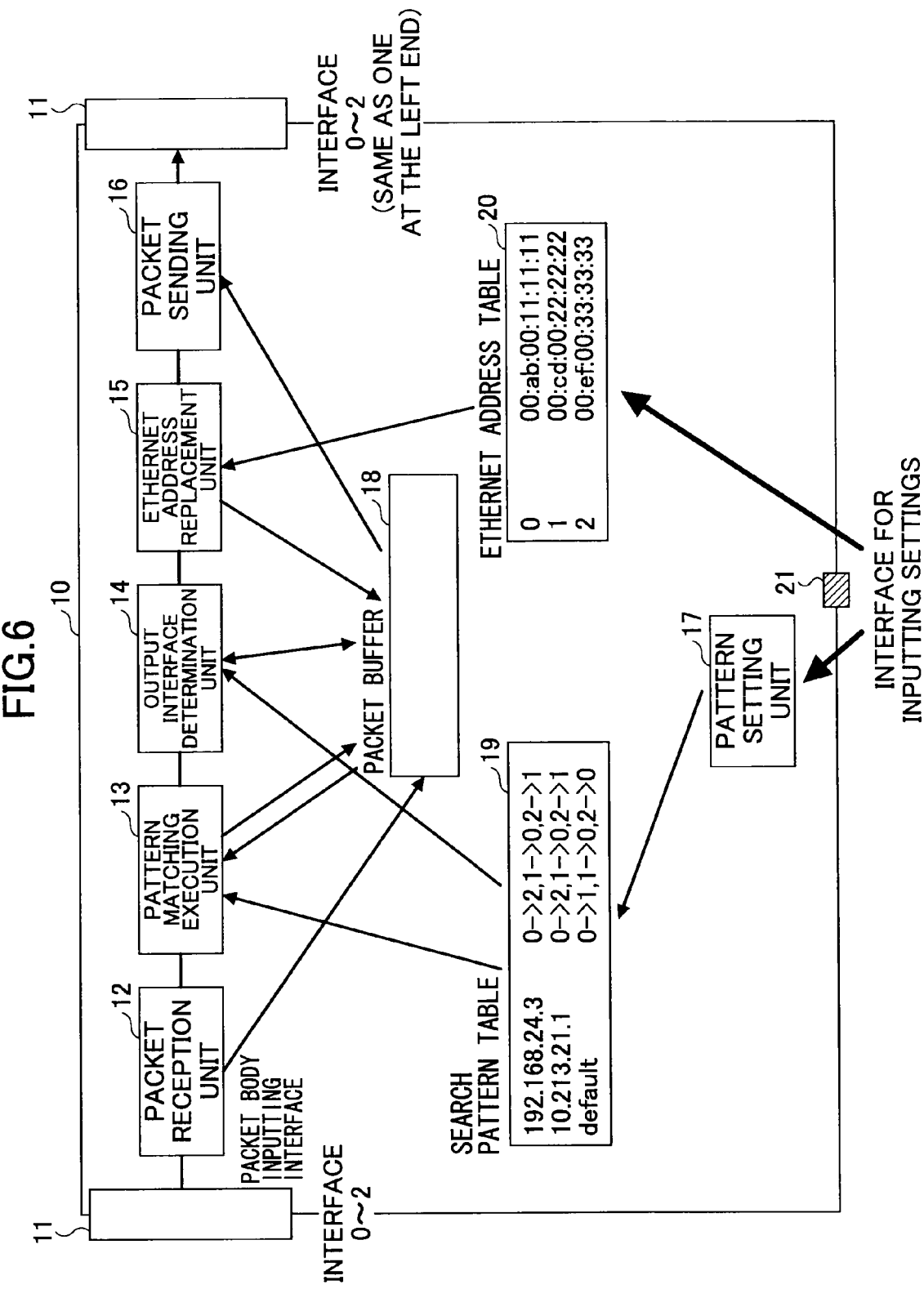
FIG. 6 is a detailed functional block diagram of the packet transfer apparatus.

FIG. 6 shows a detailed functional block diagram of the packet transfer apparatus 10. As shown in FIG. 6, the packet transfer apparatus 10 includes interfaces (11), a packet reception unit 12, a pattern matching execution unit 13, an output interface determination unit 14, an Ethernet address replacement unit 15, a packet sending unit 16, a pattern setting unit 17, and a packet buffer 18. In addition, the packet transfer apparatus 10 includes a storage apparatus such as a memory, and the storage apparatus stores a search pattern table 19, an Ethernet address table 20 and the like. Further, the packet transfer apparatus 10 includes an interface 21 for inputting setting information.

The interfaces 11 are function units for connecting to an external apparatus. For the sake of convenience, although the interfaces 11 are located in the left end and the right end in FIG. 6, they are physically implemented at a same location as a pair for input and output.

The packet reception unit 12 includes a function for receiving a packet via the interface 11, and recording the packet body and an input interface used for reception into the packet buffer 18. The pattern setting unit 17 includes a function for setting a list of search patterns and corresponding pairs of input and output interfaces, and a table of Ethernet addresses of apparatuses connected to each interface. For example, in the example of FIG. 6, the search pattern table 19 records information indicating that, when a packet having a destination IP address of 192.168.24.3 is input from the input interface 0, the packet is output to the output interface 2, and the like. In addition, the Ethernet address table 20 records information indicating that an Ethernet address of an apparatus connected to the interface 0 is 0:ab:00:11:11:11, and the like.

The pattern matching execution unit 13 includes a function for using the search pattern stored by the pattern setting unit 17 to check whether a received packet matches the search pattern, and recording the pattern number if they match.

The output interface determination unit 14 includes a function for using the check result by the pattern matching execution unit 12 and the input interface used for reception to determine an output interface from the pair of input and output interfaces corresponding to the search pattern in the search pattern table.

In order for an apparatus connected to the output interface to receive a packet properly, the Ethernet address replacement unit 15 replaces a destination Ethernet address part of the packet with an Ethernet address of the apparatus. That is, if the output interface determination unit 14 determines to send a packet to a destination different from the original destination, there is a case in which some connecting apparatuses do not receive the packet since the destination Ethernet address of the packet does not agree with that of the connection apparatus itself. Thus, the destination Ethernet address of the packet is replaced with the Ethernet address of the apparatus connected to the output interface.

The packet sending unit 16 includes a function for sending a packet to an output interface determined by the output interface determination unit 14.

The packet transfer apparatus 10 shown in FIG. 6 can be implemented by hardware. In addition, the packet transfer apparatus 10 can be also realized by installing a program for executing processes of each functional unit into a computer having network interfaces. The program can be stored in a recording medium such as a memory and a CD-ROM and the like and can be installed into the computer from the recording medium. By the way, the computer is an apparatus that includes a CPU and a memory and can execute a program, and a router is included in the computer, for example.

(Basic Operations of the Packet Transfer Apparatus)

Next, basic operations of the packet transfer apparatus 10 of the present embodiment are described. In order to cause the packet transfer apparatus 10 to perform intended operation, setting work is performed first.

In the setting work, a service manager uses the interface 21 for inputting settings so as to input a search pattern for a packet that should be sent to the harmful packet removal apparatus 30 and a pair of input and output interfaces to be used when the packet matches the search pattern.

In the present embodiment, an IP address of a server of an attack target is set to be the search pattern, and pairs of the input and output interfaces are set to be (upstream router, harmful packet removal apparatus), (downstream router, upstream router) and (harmful packet removal apparatus, downstream router). That is, when pattern matching between a destination IP address part of a received packet and a search pattern is performed and when they match, the packet received from the upstream router 40 is sent to the harmful packet removal apparatus 30, the packet received from the downstream router 50 is sent to the upstream router 40, and the packet received from the harmful packet removal apparatus 30 is sent to the downstream router 50. By the way, the search pattern is not limited to an IP address. For example, any one or a set of more than one of an IP address, a port number and a TCP flag may be used as the search pattern.

The pattern setting unit 17 receives the information, and stores it as a search pattern to be referred to by the pattern matching execution unit 13. By the way, as shown in FIG. 6, a plurality of sets of search patterns and pairs of input and output can be written. Accordingly, a plurality of attack targets can be handled simultaneously.

In addition, for specifying an output interface of a packet when it does not agree with the search pattern, default pairs of input and output are specified. In the present embodiment, pairs of default input and output interfaces are set as (upstream router, downstream router), (downstream router, upstream router) and (harmful packet removal apparatus, upstream router).

Next, Ethernet addresses of the upstream router, the downstream router and the harmful packet removal apparatus are input to the Ethernet address table.

Figure 7:
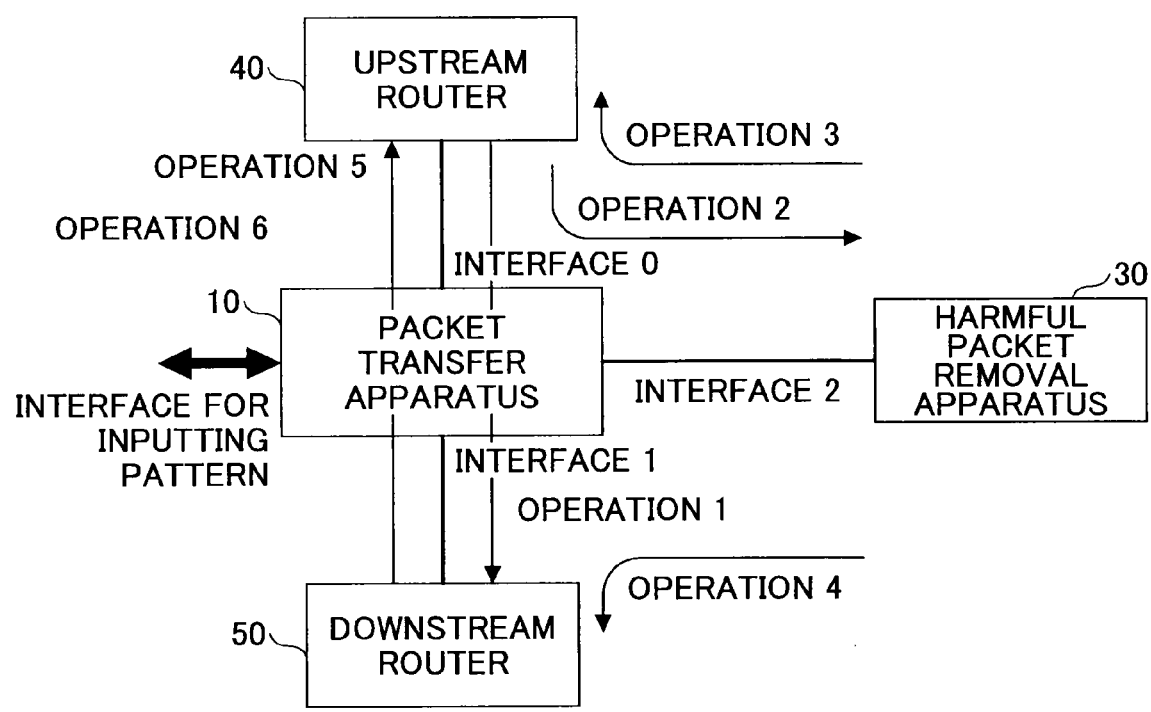
FIG. 7 is a diagram for explaining basic operations of the packet transfer apparatus in the first embodiment.

In the following, operations of the packet transfer apparatus 10 in which above-mentioned setting has been made are described. Since there are three input interfaces and there are two cases of matching or not-matching with the search pattern for each interface, there are six cases of the operations apart from whether each case actually occurs. In the following, each case is described with reference to FIG. 7.

(Operation 1) A Case in which a Packet Enters from the Upstream Router but does not Match the Search Pattern The packet reception unit 12 receives the packet from an input interface connected to the upstream router 40, and stores the packet with input interface information in the packet buffer 18. Next, the pattern matching execution unit 13 checks whether the packet matches the search pattern, and records the result (does not match in this case).

The output interface determination unit 14 determines an output interface from the pattern matching result and the input interface information. In this case, since the packet does not match the search pattern, the output interface determination unit 14 determines to output the packet to the downstream router 50 according to a pair (upstream router, downstream router) of the default input and output interfaces.

The Ethernet address replacement unit 15 replaces a destination Ethernet address in the packet according to an output interface. But, in this case, the upstream router 40 sends the packet to the downstream router 50, and since it is the same as the output destination of the packet transfer apparatus 10, the packet does not change. Then, the packet sending unit 16 sends the packet to the output interface to which the downstream router 50 is connected.

(Operation 2) A Case in which a Packet Enters from the Upstream Router and Matches the Search Pattern The packet reception unit 12 receives a packet from a network interface connected to the upstream router 40, and stores the packet into the packet buffer 18 with input interface information. Then, the pattern matching execution unit 13 checks whether the packet matches the search pattern and records the result (matches in this case).

The output interface determination unit 14 determines an output interface from the pattern matching result and the input interface information. In this case, since the packet matches the search pattern, the output interface determination unit 14 determines to output the packet to the harmful packet removal apparatus 30. Then, the Ethernet address replacement unit 15 replaces the destination Ethernet address in the packet according to the output interface. In this case, the destination Ethernet address is rewritten with the Ethernet address of the harmful packet removal apparatus 30. The packet sending unit 16 sends the packet to the output interface connected to the harmful packet removal apparatus 30.

(Operation 3) A Case in which a Packet Enters from the Harmful Packet Removal Apparatus and does not Match the Search Pattern Since the harmful packet removal apparatus 30 receives a packet that matches the search pattern, and sends out only harmless packets in received packets, there is no case in which a packet received from the harmful packet removal apparatus 30 does not match the search pattern in ordinary cases. But, for covering every case, this case is described.

The packet reception unit 12 receives a packet from an input interface, and stores the packet into the packet buffer 18 with input interface information. The pattern matching execution unit 13 checks whether the packet matches the search pattern and records the result (does not match in this case).

Then, the output interface determination unit 14 determines an output interface from the pattern matching result and the input interface information. In this case, the packet does not match the search pattern and is received from the harmful packet removal apparatus 30, the output interface determination unit 14 determines to output the packet to the upstream router 40. The Ethernet address replacement unit 15 replaces the destination Ethernet address in the packet with the Ethernet address of the upstream router 40 according to the output interface, and the packet sending unit 16 sends the packet to the output interface connected to the upstream router 40.

(Operation 4) A Case in which a Packet Enters from the Harmful Packet Removal Apparatus and Matches the Search Pattern This packet corresponds to a packet that has been certified not to be an attack packet among packets sent to the harmful packet removal apparatus 30 in (operation 2). That is, there is a case in which content of the packet is the same as the packet handled in (operation 2).

The packet reception unit 12 receives a packet from an input interface, and stores the packet into the packet buffer 18 with input interface information. The pattern matching execution unit 13 checks whether the packet matches the search pattern and records the result (matches in this case).

Then, the output interface determination unit 14 determines an output interface from the pattern matching result and the input interface information. In this case, the packet matches the search pattern, and is received from the harmful packet removal apparatus 30, the output interface determination unit 14 determines to output the packet to the downstream router 50.

The Ethernet address replacement unit 15 replaces the destination Ethernet address in the packet according to the output interface. In this case, the destination Ethernet address is replaced with the Ethernet address of the downstream router 50. The packet sending unit 16 sends the packet to the output interface.

(Operation 5) A Case in which a Packet Enters from the Downstream Router and does not Match the Search Pattern The packet reception unit 12 receives a packet from an input interface, and stores the packet into the packet buffer 18 with input interface information. The pattern matching execution unit 13 checks whether the packet matches the search pattern and records the result (does not match in this case). The output interface determination unit 14 determines an output interface from the pattern matching result and the input interface information. In this case, since the packet does not match the search pattern, the output interface determination unit 14 determines to output the packet to the upstream router 40. The Ethernet address replacement unit 15 replaces the Ethernet address in the packet according to the output interface. But, in this case, since the downstream router 50 sends the packet to the upstream router 40, the packet does not change. Then, the packet sending unit 30 sends the packet to an output interface connected to the upstream router 40.

(Operation 6) A Case in which a Packet Enters from the Downstream Router and Matches the Search Pattern Since the downstream router 50 knows that there is the attack target under the downstream router 50, this operation does not occur in ordinary cases. But, for covering every case, this case is described.

The packet reception unit 12 receives a packet from an input interface, and stores the packet into the packet buffer 18 with input interface information. The pattern matching execution unit 13 checks whether the packet matches the search pattern and records the result (matches in this case). Then, the output interface determination unit 14 determines an output interface from the pattern matching result and the input interface information. In this case, although the packet matches the search pattern, since the packet is received from the downstream router 50, the output interface determination unit 14 determines to output the packet to the upstream router 40. The Ethernet address replacement unit 15 replaces the destination Ethernet address in the packet according to the output interface. In this case, the address is replaced with the Ethernet address of the upstream router 40. The packet sending unit 16 sends the packet to the output interface.

(Applied Operation)

In harmful packet removal apparatuses 30, there is one that performs operation as a relay apparatus of a service in addition to the operation as a simple filter as described in the above-mentioned examples. The harmful packet removal apparatus 30 that performs such operation as a relay apparatus is used for addressing an attack in which a client sends a connection request to a server, but the client does not perform processes after that so as to consume resources of the server in a client and server model such as http protocol.

In the present example, it is shown that the packet transfer apparatus 10 of the present embodiment can also properly address the harmful packet removal apparatus 30 performing such operation. In the following explanation, an attack target that the harmful packet removal apparatus 30 will protect is referred to as "server", and a source of a packet that tries to access the sever is referred to as "client", and a service relay function in the harmful packet removal apparatus 30 is referred to as a relay apparatus 35.

Figure 8:
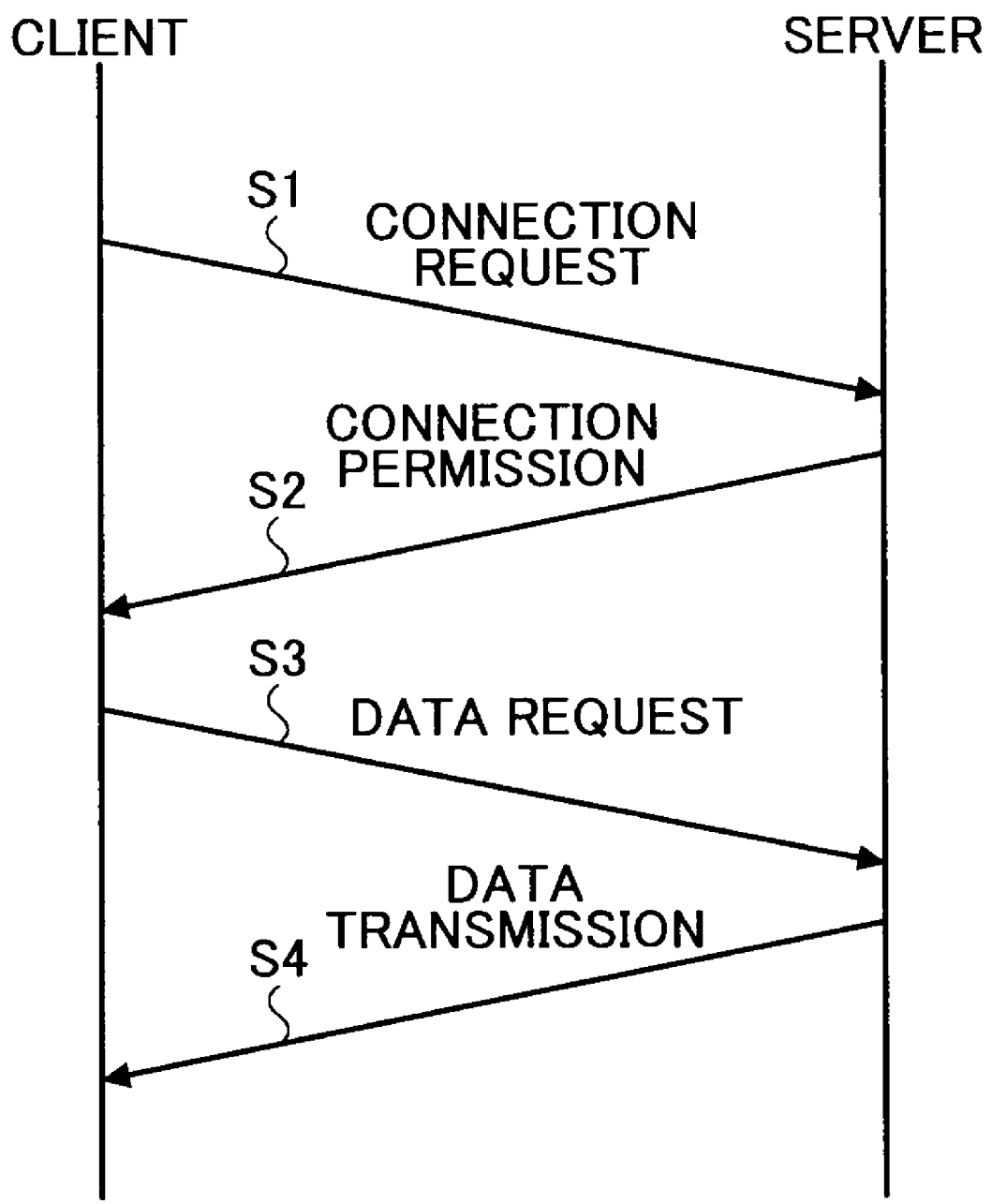
FIG. 8 is a diagram for explaining a service handled in an applied operation of the packet transfer apparatus in the first embodiment.

It is assumed that the service handled by this applied operation is one following a protocol shown as a sequence in FIG. 8. That is, a connection request is sent from the client to the server (step 1), a connection permission is sent from the server to the client (step 2). After that, a data request is sent from the client to the server (step 3), and data transmission is performed from the server to the client (step 4).

For causing the packet transfer apparatus 10 to perform the applied operation, a search pattern is added to the packet transfer apparatus 10. In this embodiment, a search condition of a packet is made such that a destination IP address of the packet is required to be an IP address (to be referred to as an address of the relay apparatus hereinafter) used for the relay apparatus 35 set in the harmful packet removal apparatus 30, and pairs of input and output interfaces used when the search condition is satisfied are set to be (upstream router, downstream router), (downstream router, harmful packet removal apparatus) and (harmful packet removal apparatus, upstream router), so that a search pattern is added.

Figure 9:
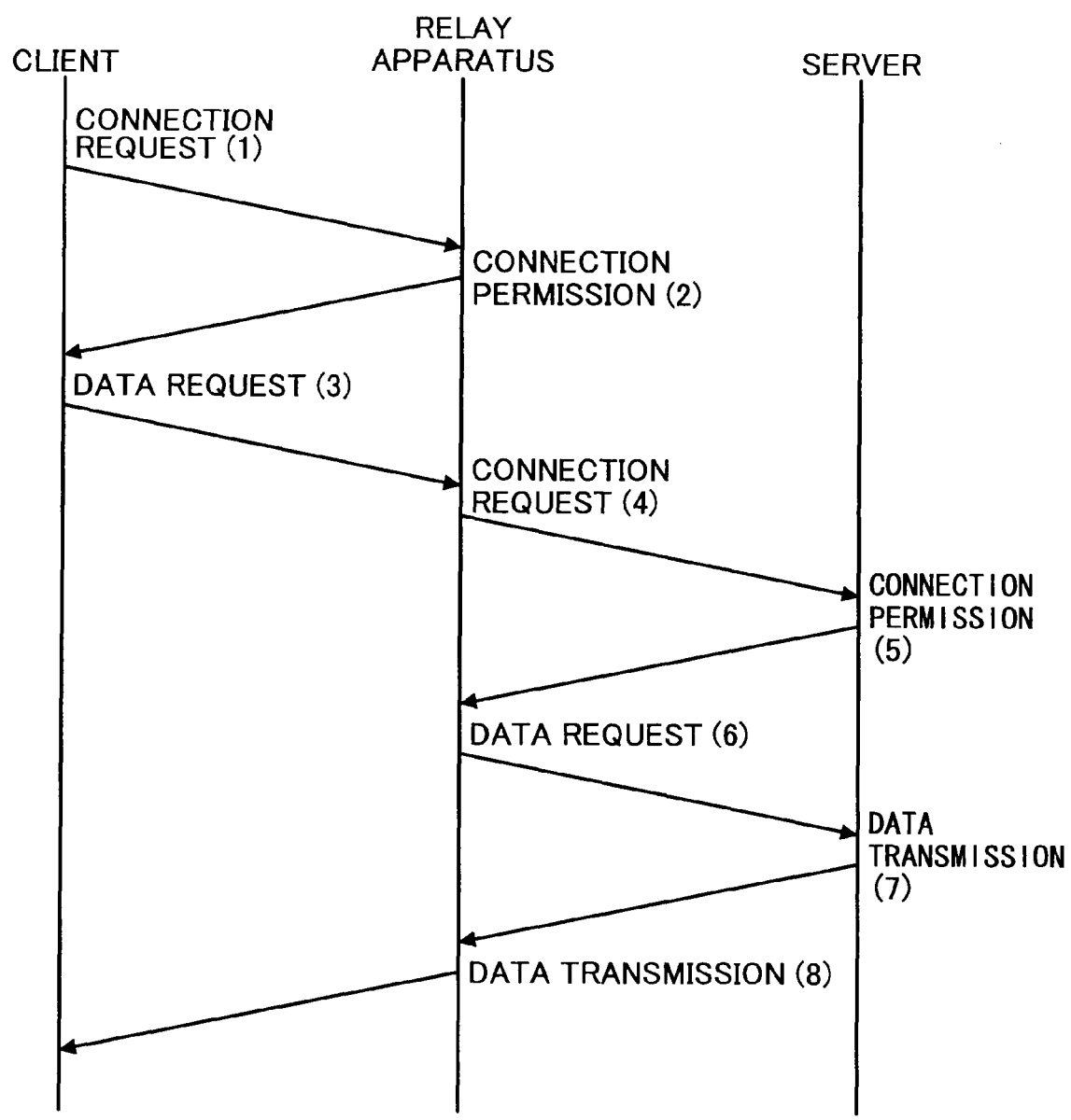
FIG. 9 is a diagram for explaining the applied operation of the packet transfer apparatus in the first embodiment.
Figure 10:
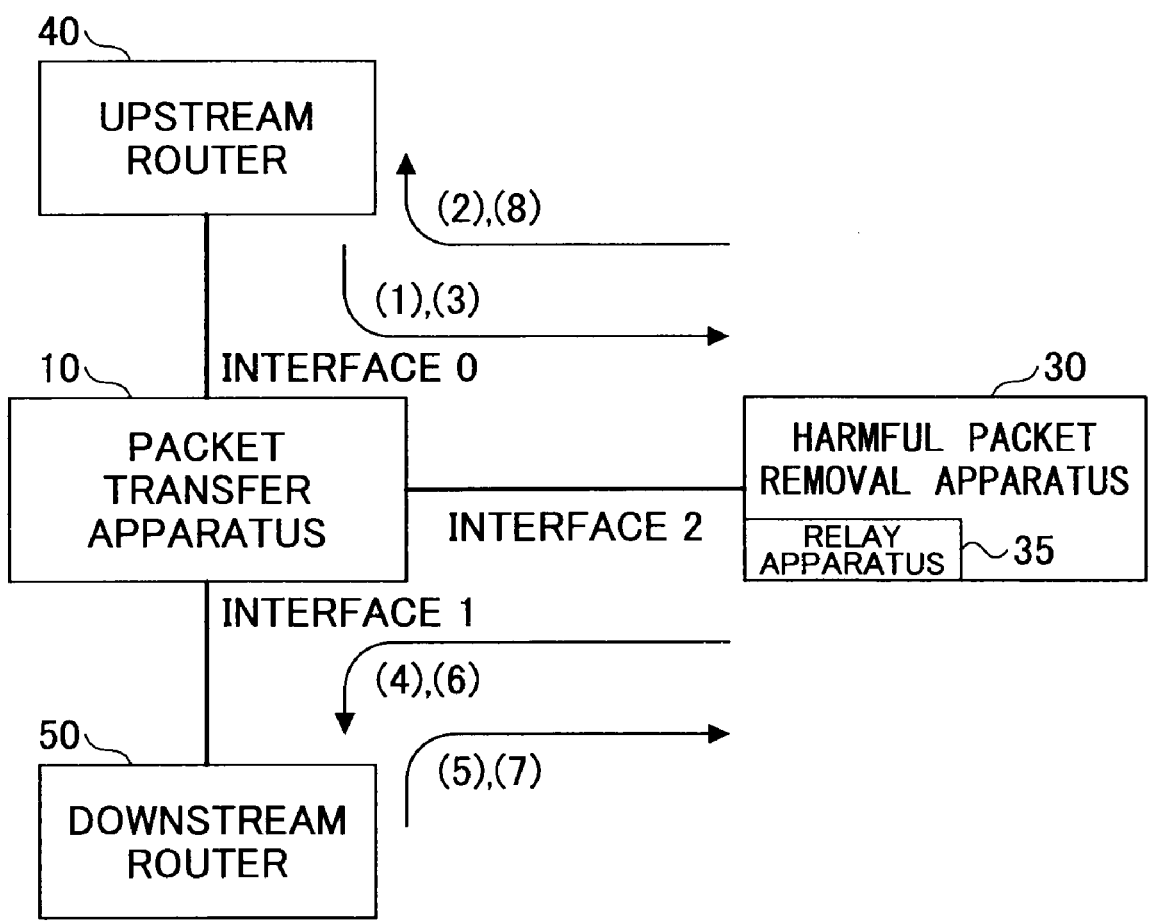
FIG. 10 is a diagram for explaining the applied operation of the packet transfer apparatus in the first embodiment.

The applied operation is described with reference to a sequence chart of FIG. 9 and a packet flow diagram of FIG. 10. In the figures, a parenthesized number indicates a packet, and it corresponds to a number added at the end of "packet" in the following descriptions.

First, operation for a connection request packet (1) sent from the client to the server is described. This packet (1) is received by the packet transfer apparatus 10 from the upstream router 40. Since this packet (1) corresponds to the case of the operation 2 in the basic operations, this packet (1) is sent to the harmful packet removal apparatus 30.

The relay apparatus 35 in the harmful packet removal apparatus 30 returns (on behalf of the server) a response packet (2) to the client. The source of the packet is the server and the destination is the client. Since the packet (2) corresponds to the case of operation 3 in the basic operations, the packet (2) is sent to the upstream router 40 and reaches the client.

Next, operation for a data request packet (3) going toward the server from the client after connection permission is described.

This packet (3) is received by the packet transfer apparatus 10 from the upstream router 40. In the same way as the case of the packet (1), since the packet (3) corresponds to the operation 2 of the basic operations, this packet (3) is sent to the harmful packet removal apparatus 30. The relay apparatus 35 sends a connection request packet (4) to the server. This packet (4) has an address, as a source, for relay function used in adding of the search pattern, and has an address of the server as a destination.

Since this packet (4) corresponds to the operation 4 of the basic operations, the packet transfer apparatus 10 outputs the packet (4) to the downstream router 50, so that the packet (4) reaches the server. Next, the server outputs a connection permission packet (5) in response to the connection request (4). The destination of the connection permission packet (5) is the address of the relay apparatus, and the packet (5) enters the packet transfer apparatus 10 from the downstream router 50.

Since the packet (5) corresponds to the added search pattern, the packet (5) is output to the harmful packet removal apparatus 30. Since the relay apparatus 35 receives the connection permission (5), the relay apparatus 35 sends a data request packet (6) to the server. Since the data request packet (6) corresponds to the operation 4 of the basic operations, the packet (6) is output to the downstream router 50 and reaches the server.

The server outputs a data packet (7) in response to the data request (6). The destination of the data packet (7) is an address of the relay apparatus 35 that is a source of the data request. This packet (7) enters the packet transfer apparatus 10 from the downstream router. Since this packet (7) corresponds to the added search pattern, the packet (7) is output to the harmful packet removal apparatus 30. The relay apparatus 35 receives the data (7) and transfers the data to the client. In this packet (8), the source is the address of the server and the destination is the address of the client. Since this packet (8) corresponds to the operation 3 of the basic operations, the packet (8) is output to the upstream router 40 and reaches the client.

(A Case in which More than One Harmful Packet Removal Apparatus is Connected)

Figure 11:
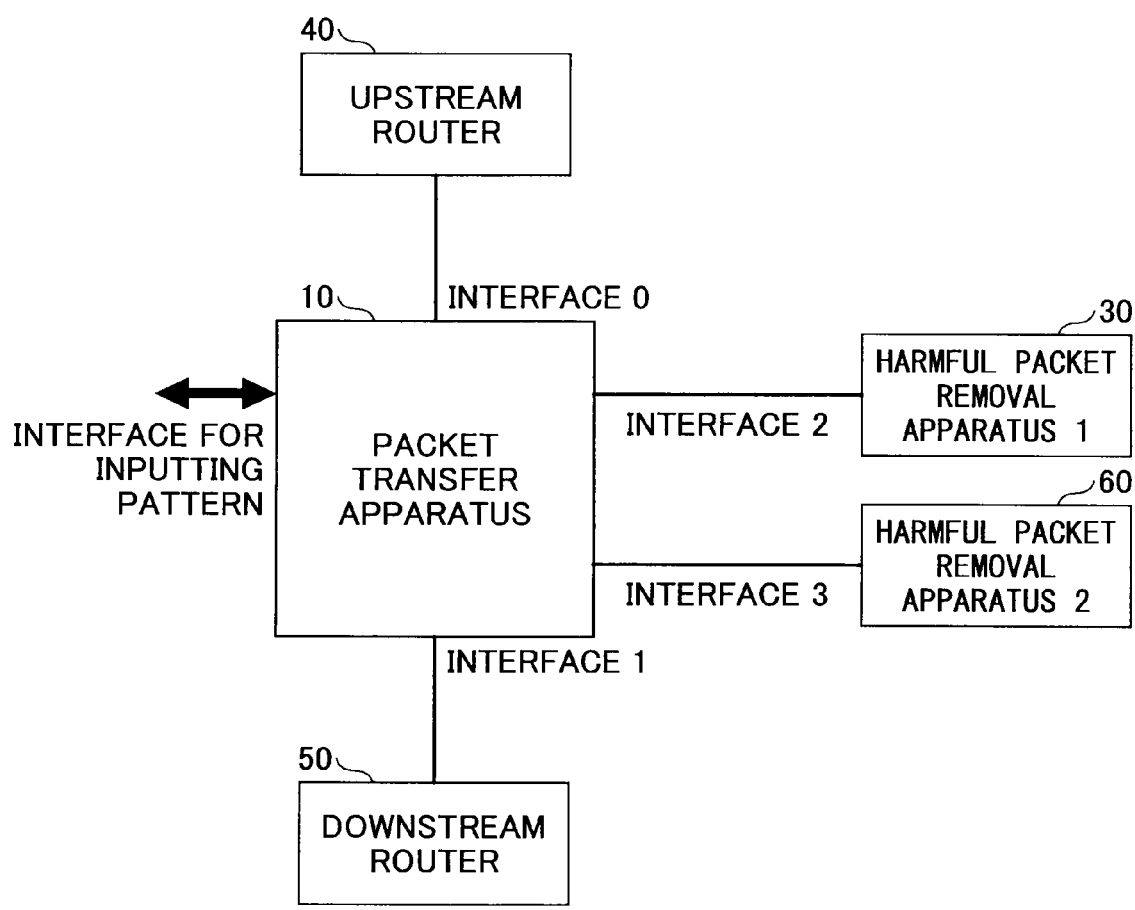
FIG. 11 is a diagram showing a configuration when two harmful packet removal apparatuses are connected to the packet transfer apparatus.

By increasing the number of interfaces of the packet transfer apparatus 10, it becomes possible to connect a plurality of harmful packet removal apparatuses to the packet transfer apparatus 10. By connecting a plurality of harmful packet removal apparatuses, load distribution can be realized. FIG. 11 shows a configuration when two harmful packet removal apparatuses are connected. As to the packet transfer apparatus 10 of the present embodiment, for connecting a plurality of harmful packet removal apparatuses, there is no need to specially change the apparatus except that pairs of input and output interfaces are added.

(Speed-Up of the Ethernet Address Replacement Unit)

The size of the Ethernet address is six bytes, and when memory read and write is performed in units of eight bytes in hardware that configures the packet transfer apparatus 10 of the present embodiment, rewriting of the destination Ethernet address of a packet on the packet buffer 18 configured by the memory can be performed according to the following procedure.

First, eight bytes (head two bytes are the last two bytes of a source Ethernet address) including the destination Ethernet address of the packet recorded in the packet buffer 18 is read from the packet buffer 18. Then, the part of the two bytes other than the destination Ethernet address is obtained from the read data, and eight bytes that should be written are loaded on a register, and the data on the register is written into the packet buffer 18.

In the case of the packet transfer apparatus 10 of the present embodiment, Ethernet addresses of connected apparatuses are known and a source Ethernet address of a packet received from an interface is also recorded. Thus, by using these addresses, speed-up for rewriting the destination Ethernet address can be realized as follows.

Eight bytes that should be written are loaded on a register using lower two bytes of a source Ethernet address of the packet and six bytes of the destination Ethernet address, so that the data on the register is written in the packet buffer. For realizing the speed-up process, although it is necessary to set Ethernet addresses of upstream and downstream routers beforehand, since these are recorded in the Ethernet address table in the present embodiment, these can be used, By the way, this speed-up provides large effect especially for an apparatus which takes much time for reading.

Second Embodiment

Next, a second embodiment of the present invention is described. In the first embodiment, the packet transfer apparatus 10 determines an output interface from a search pattern of the packet and an input interface. On the other hand, in the second embodiment, when the packet matches the search pattern, the output interface is determined only from the search pattern.

A basic connection form of the packet transfer apparatus 10 in the second embodiment is shows as FIG. 4 similarly to the first embodiment.

Figure 12:
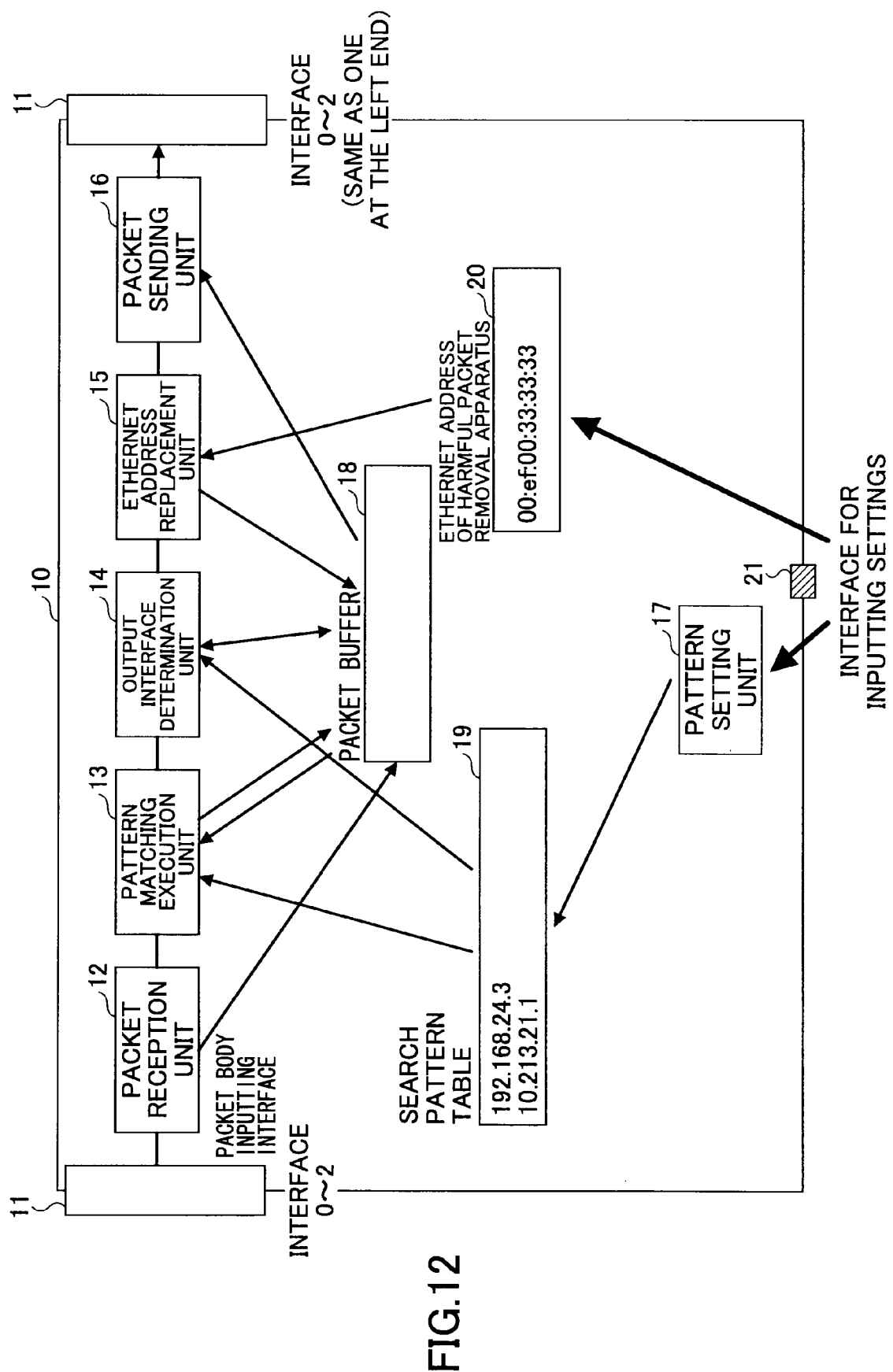
FIG. 12 is a detailed functional block diagram of the packet transfer apparatus in the second embodiment.

FIG. 12 shows a detailed configuration of the packet transfer apparatus 10 in the second embodiment. The basic configuration is similar to the configuration of the packet transfer apparatus of the first embodiment. But, since the output interface is determined only from the search pattern when the packet matches the search pattern in the second embodiment, information recorded in the search pattern table 19 and the Ethernet address table 20 and the like is different. In the following, the configuration of the packet transfer apparatus 10 of the second embodiment is described mainly for points different from the first embodiment.

In the same way as the first embodiment, the packet reception unit 12 includes a function for receiving a packet via the interface, and storing the packet body and an input interface used for the reception into the packet buffer 18. The pattern setting unit 17 records only search patterns as the search pattern table 19. In the Ethernet address table 20, the Ethernet address of the harmful packet removal apparatus 30 is recorded.

The pattern matching execution unit 13 includes a function for using the search pattern stored by the pattern setting unit 17 to check whether a received packet matches the search pattern, and recording a result whether they match.

The output interface determination unit 14 includes a function for determining an output interface based on the check result by the pattern matching execution unit 13.

The Ethernet address replacement unit 15 includes a function for replacing a destination Ethernet address part of the packet with an Ethernet address of the harmful packet removal apparatus 30 recorded in the Ethernet address table 20 when outputting a packet to the harmful packet removal apparatus 30.

(Basic Operation)

Next, basic operations of the packet transfer apparatus 10 of the present embodiment are described. In order to cause the packet transfer apparatus 10 to perform intended operation, setting work is performed first.

Also in the present embodiment, a search pattern of a packet is made such that an IP address of a server of an attack target is required to exist in the part of the destination address, and the pattern is stores. In addition, a packet that matches the search pattern is sent to the harmful packet removal apparatus 30. A plurality of search patterns can be recorded, so that it becomes possible to handle a plurality of attack targets at the same time. In addition, the Ethernet address of the harmful packet removal apparatus 30 is input into the Ethernet address table 20.

In the present embodiment, comparison of the search pattern is performed for only a packet input from the upstream router 40 or the downstream router 50, and comparison of the search pattern for a packet from the harmful packet removal apparatus 30 is not performed.

An output interface of a packet when it does not match any search pattern is predetermined. In the present embodiment, output interfaces are predetermined to be upstream router→downstream router, downstream router→upstream router, harmful packet removal apparatus→upstream router or downstream router (according to a sending destination specified by the harmful packet removal apparatus). That is, when a packet does not match any search pattern, the packet received from the upstream router 40 is sent to the downstream router 50, the packet received from the downstream router 50 is sent to the upstream router 40.

A packet received from the harmful packet removal apparatus 30 is sent to the upstream router 40 or the downstream router 50 according to a sending destination (destination Ethernet address) specified by the harmful packet removal apparatus. That is, the packet transfer apparatus has information of destination Ethernet addresses of the upstream router 40 and the downstream router 50, and network interfaces corresponding to them, so that the packet transfer apparatus sends the packet to a sending destination specified by the harmful packet removal apparatus based on the information.

Figure 13:
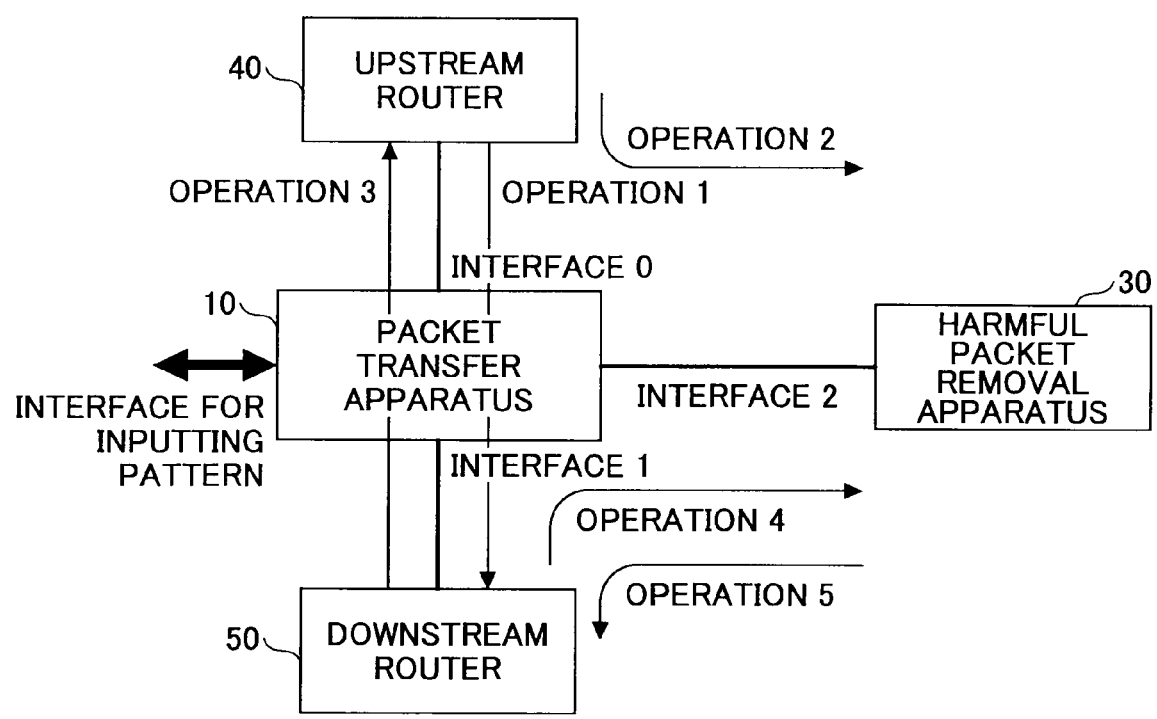
FIG. 13 is a diagram for explaining basic operations of the packet transfer apparatus in the second embodiment.

In the following, operation of the packet transfer apparatus 10 in which above-mentioned setting has been made is described. There are two interfaces for which search pattern comparison may be performed, thus, there are four cases based on matching or not-matching with the search pattern for each case, and there is a case of input from the harmful packet removal apparatus 30. Since these five cases cover all possibilities, each case is described with reference to FIG. 13.

(Operation 1) A Case in which a Packet Enters from the Upstream Router but does not Match any Search Pattern The packet reception unit 12 receives the packet from an input interface, and stores the packet with input interface information in the packet buffer 18. The pattern matching execution unit 13 performs pattern matching to record a result that the packet does not match any search pattern. Since the packet does not match any search pattern, the output interface determination unit 14 determines to output the packet to the downstream router 50, and the packet sending unit 16 sends the packet to the output interface to which the downstream router 50 is connected.

(Operation 2) A Case in which a Packet Enters from the Upstream Router and Match a Search Pattern The packet reception unit 12 receives a packet from an input interface, and stores the packet into the packet buffer 18 with input interface information. The pattern matching execution unit 13 records a result that the packet match a search pattern. Since the packet match the search pattern, the output interface determination unit 14 determines to output the packet to the harmful packet removal apparatus 30. Then, the Ethernet address replacement unit 15 replaces the destination Ethernet address of the packet with the Ethernet address of the harmful packet removal apparatus 30, and the packet sending unit 16 sends the packet to the output interface connected to the harmful packet removal apparatus 30.

(Operation 3) A Case in which a Packet Enters from the Downstream Router and does not Match any Search Pattern The packet reception unit 12 receives a packet from an input interface, and stores the packet into the packet buffer 18 with input interface information. The pattern matching execution unit 13 checks whether the packet match a search pattern, and records a result that the packet does not match any search pattern. Since the packet does not match any search pattern, the output interface determination unit 14 determines to output the packet to the upstream router 40, and the packet sending unit 16 sends the packet to the output interface connected to the upstream router 40.

(Operation 4) A Case in which a Packet Enters from a Downstream Router and Matches a Search Pattern Although the operation 4 does not occur in normal operations since the downstream router 40 knows that there is an attack object under the downstream router 40, this operation is described for covering every case.

The packet reception unit 12 receives a packet from an input interface, and stores the packet into the packet buffer 18 with input interface information. The pattern matching execution unit 13 performs pattern matching to record a result that the packet matches a search pattern. Since the packet matches the search pattern, the output interface determination unit 14 determines to output the packet to the harmful packet removal apparatus 30. Then, the Ethernet address replacement unit 15 replaces the destination Ethernet address of the packet with the Ethernet address of the harmful packet removal apparatus 30, and the packet sending unit 16 sends the packet to the output interface connected to the harmful packet removal apparatus 30.

(Operation 5) A Case in which a Packet Enters from the Harmful Packet Removal Apparatus This packet corresponds to a packet that has been certified not to be an attack packet among packets sent to the harmful packet removal apparatus in operation 2. That is, there is a case in which content of the packet is the same as the packet handled in operation 2.

The packet reception unit 12 receives a packet from an input interface, and stores the packet into the packet buffer 18 with input interface information. In operation 5, the output interface determination unit 14 follows an output destination designation (designated as a destination Ethernet address of the packet) by the harmful packet removal apparatus 30. Since the downstream router 50 is designated in ordinary cases, it is assumed that the downstream router 50 is designated also in this embodiment. The packet sending unit 16 sends the packet to the output interface connected to the downstream router 50.

(Applied Operation)

Also in the second embodiment, in the same way as the case described in the first embodiment, the packet transfer apparatus 10 can be applied to a harmful packet removal apparatus 30 that operates as a relay apparatus 35. Also in the present embodiment, an applied service is one shown in FIG. 8.

In the present embodiment, the relay apparatus 35 is provided with a specific routing information table, and is provided with a function for outputting a packet by adding a destination Ethernet address of the downstream router 50 when the packet is for the server, and by adding a destination Ethernet address of the upstream router 50 for other packets. Also, in the present embodiment, a search pattern is added in which a search condition is set such that an IP address (to be referred to as an address of the relay apparatus hereinafter) used for the relay apparatus 35 set in the harmful packet removal apparatus 30 is required to exist in the destination address. That is, in addition to the case described in the basic operations, the packet transfer apparatus 10 sends the packet to the harmful packet removal apparatus 30 also when the packet matches the address of the relay apparatus.

In the following, the applied operation of the second embodiment is described with reference to FIGS. 9 and 10 again that were referred to in the first embodiment. In the figures, a parenthesized number indicates a packet, and corresponds to a number added at the end of "packet" in the following descriptions.

First, operation for a connection request packet (1) sent from the client to the server is described.

This packet (1) is received by the packet transfer apparatus 10 from the upstream router 40. Since this packet (1) corresponds to the case of the operation 2 in the basic operations, this packet (1) is sent to the harmful packet removal apparatus 30.

The relay apparatus 35 in the harmful packet removal apparatus 30 returns (on behalf of the server) a response packet (2) to the client. The source of the packet is the server and the destination is the client. Although this packet (2) corresponds to the case of operation 5 of the basic operations, since the destination Ethernet address of the packet sent from the harmful packet removal apparatus 30 is the Ethernet apparatus of the upstream router 40, the packet transfer apparatus 10 sends the packet (2) to the upstream router 40, so that the packet (2) reaches the client.

Next, operation for a data request packet (3) going toward the server from the client after connection permission is described.

This packet (3) is received by the packet transfer apparatus 10 from the upstream router 40. In the same way as the case of the packet (1), since the packet (3) corresponds to the operation 2 of the basic operations, this packet (3) is sent to the harmful packet removal apparatus 30. The relay apparatus 35 sends a connection request packet (4) to the server. This packet (4) has an address, as a source, for relay function used in adding of the search pattern, and has an address of the server as a destination.

This packet (4) is output to the downstream router 50 according to the operation 5 of the basic operations, and reaches the server. Next, the server outputs a connection permission packet (5) for the connection request (4). The destination of the connection permission packet (5) is the address of the relay apparatus, and the packet (5) enters the packet transfer apparatus 10 from the downstream router 50.

Since the packet (5) corresponds to the added search pattern, the packet (5) is output to the harmful packet removal apparatus 30. Since the relay apparatus 35 receives the connection permission (5), the relay apparatus 35 sends a data request packet (6) to the server.

The packet (6) is output to the downstream router 50 according to the operation 5 of the basic operations and reaches the server. Then, the server outputs a data packet (7) in response to the data request (6). The destination of the data packet (7) is an address of the relay apparatus 35 that is a source of the data request. This packet (7) enters the packet transfer apparatus 10 from the downstream router 50.

Since this packet (7) corresponds to the added search pattern, the packet (7) is output to the harmful packet removal apparatus 30. The relay apparatus 35 receives the data (7) and transfers the data to the client. In this packet (8), the source is the address of the server and the destination is the address of the client. The packet transfer apparatus that received the packet from the harmful packet removal apparatus 30 outputs the packet (8) to the upstream router 40 according to the operation 5 of the basic operations. Then, the packet (8) reaches the client.

(A Case in which More than One Harmful Packet Removal Apparatus is Connected)

Figure 14:
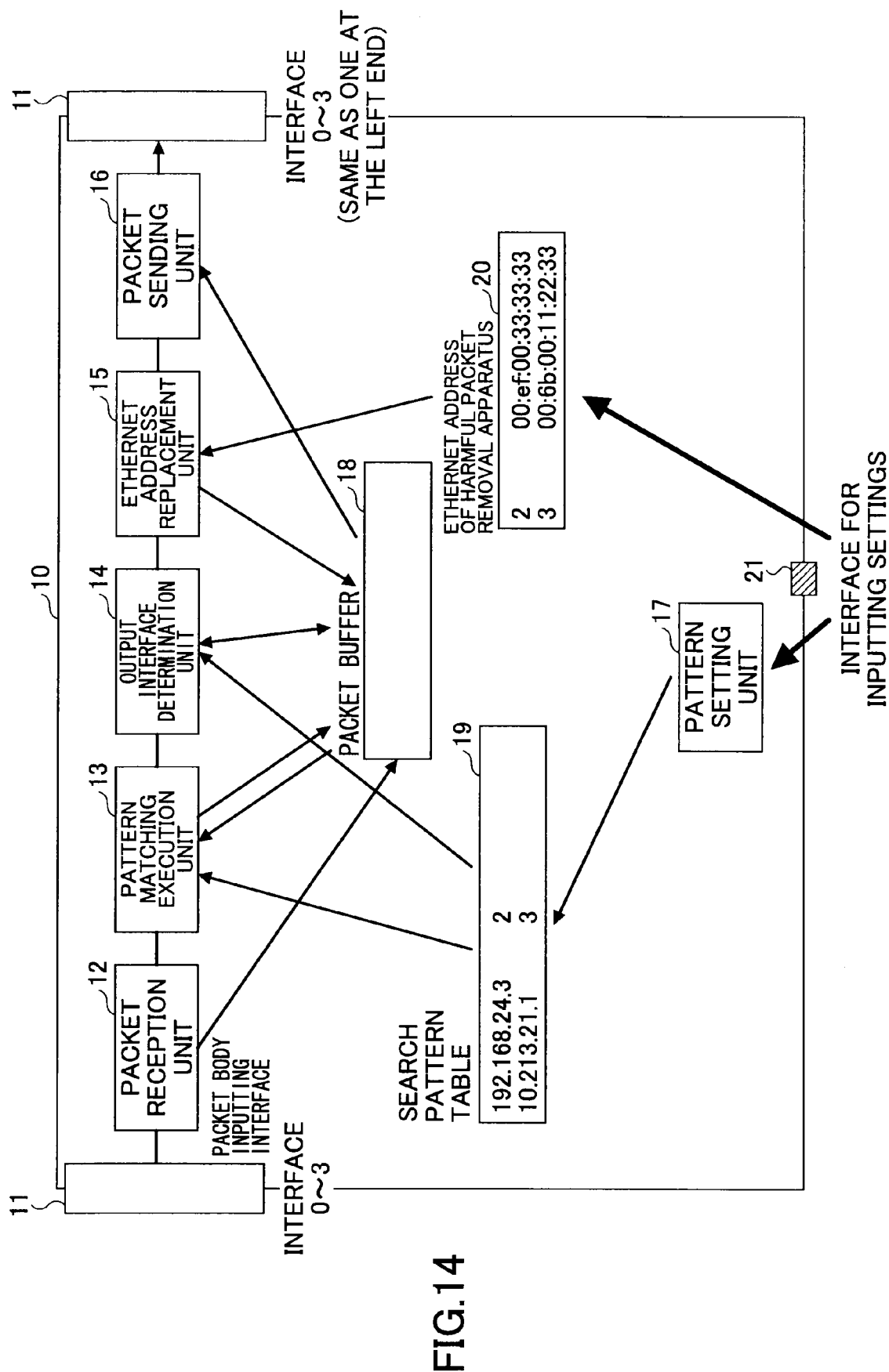
FIG. 14 is a diagram showing a configuration of the packet transfer apparatus when a plurality of harmful packet removal apparatuses are connected to the packet transfer apparatus in the second embodiment.

In the same way as the case shown in FIG. 11 in the first embodiment, more than one harmful packet removal apparatus can be connected also in the second embodiment. However, in this case, the inside of the packet transfer apparatus 10 is configured as shown in FIG. 14. The configuration shown in FIG. 14 is different from the case in which one harmful packet removal apparatus 30 is connected in the following points.

In the search pattern table 19, an interface to which a packet is output when matching is specified for each search pattern. In addition, an Ethernet address of the harmful packet removal apparatus is recorded for each harmful packet removal apparatus. In addition, in the operations 2 and 4 in the basic operations, when the pattern matching execution unit 13 determines that the packet matches a search pattern, not only the result of that but also which pattern matches the packet are recorded, and the output interface determination unit 14 outputs the packet to an output interface specified by the matched search pattern. In addition, the Ethernet address replacement unit 15 replaces the destination Ethernet address of the packet with an Ethernet address corresponding to a harmful packet removal apparatus connected to an interface specified as the output interface.

It is also possible to perform speed-up of the Ethernet address replacement unit 15 in the same way as the first embodiment. However, it is necessary to set Ethernet addresses of the upstream and downstream routers beforehand.

(Difference Between the Packet Transfer Apparatus and a Router in the Embodiments of the Present Invention)

The packet transfer apparatus of the embodiments of the present invention is different from routers configuring a conventional network in the following points.

Although the router determines an output interface using routing information that is shared in the network or using specific routing information, the packet transfer apparatus determines an output interface without using routing information, but using a specific pattern in the packet. In addition, since the packet transfer apparatus of the first embodiment especially uses input interface information for determining an output interface, it is possible to specify different output interfaces when packets having a same destination address enter from different interfaces. But, the router outputs a packet having a same destination address to a same output interface irrespective of the interface from which the packet is input.

In addition, although the router cannot use information other than the destination address for determining an output interface, the packet transfer apparatus can use any information other than the destination address in the packet for determining an output interface.

(Effects of the Packet Transfer Apparatus in the Embodiments of the Present Invention)

Figure 2:
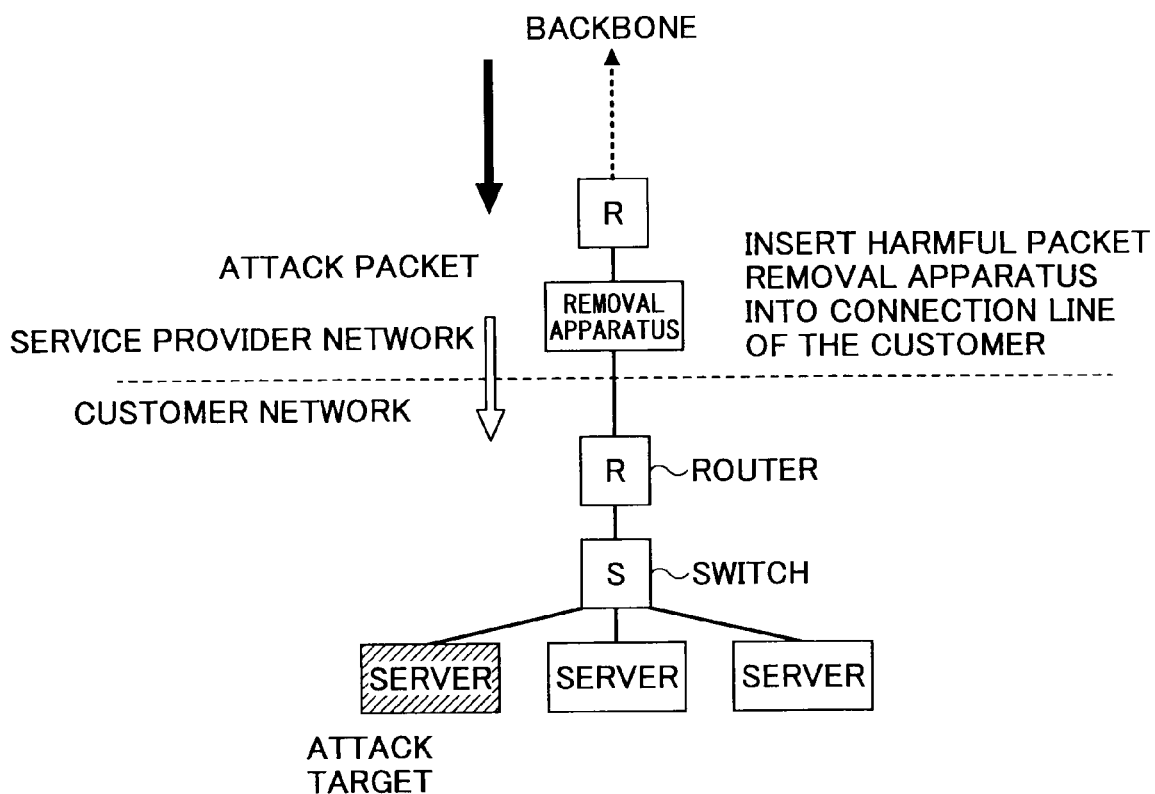
FIG. 2 is a diagram for explaining a first method using the harmful packet removal apparatus in a conventional technology.
Figure 3:
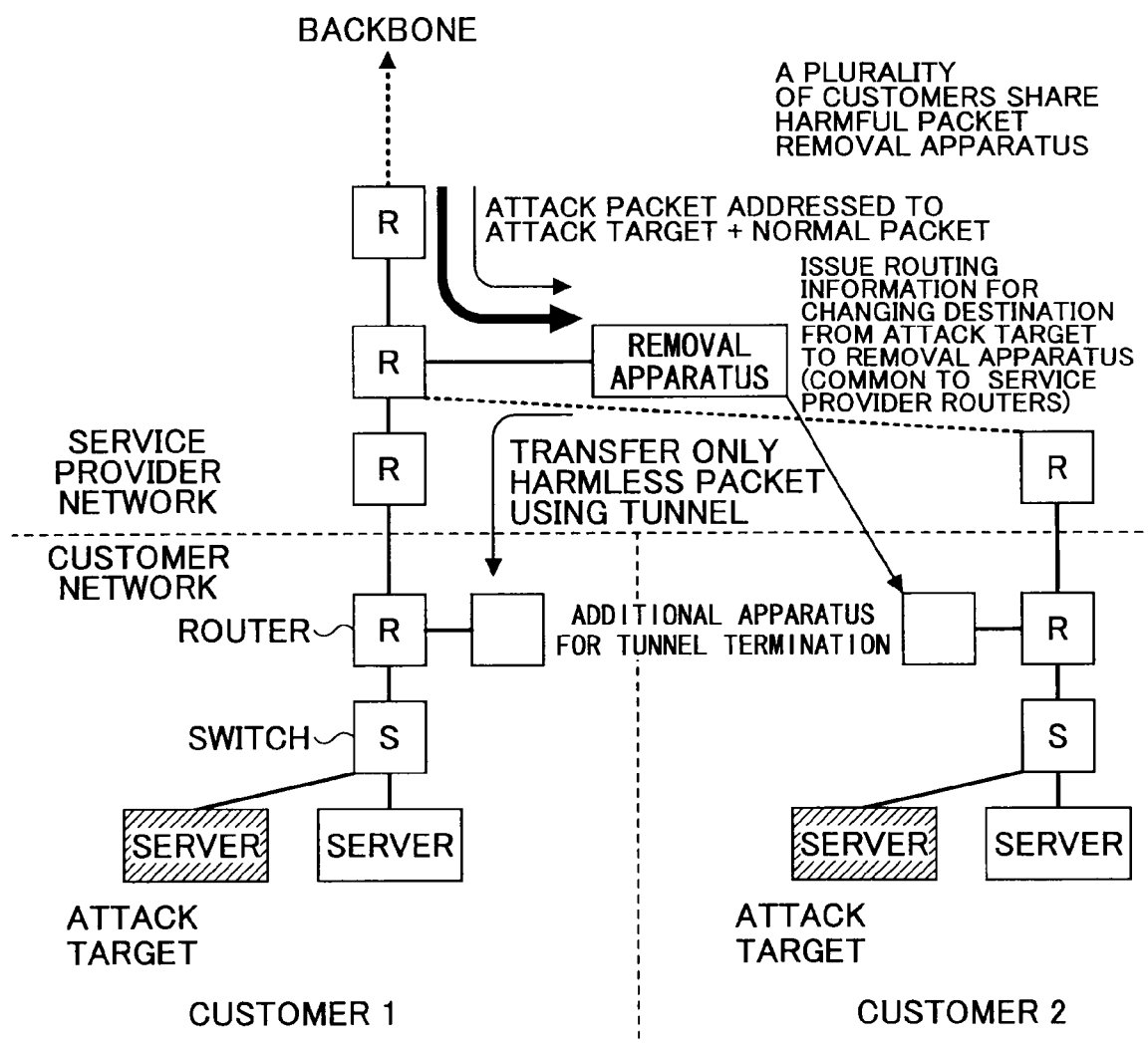
FIG. 3 is a diagram for explaining a second method using the harmful packet removal apparatus in a conventional technology.

By using the packet transfer apparatus of the embodiments of the present invention, an effect that a harmful packet removal apparatus can be shared among a plurality of customers is obtained compared with the conventional scheme 1 described in FIG. 2. In addition, compared with the conventional scheme 2 described with reference to FIG. 3, following effects can be obtained.

According to the packet transfer apparatus, since it is not necessary to change routing information of routes and it is not necessary to introduce the tunnel, it becomes unnecessary to add a tunnel termination apparatus in the customer network side, and a service can be realized without increasing new settings and load in the routers.

In addition, since configuration components of the service exists only in the network of the service provider, it is not necessary to perform remote operation. In addition, since it is not necessary to dynamically operate routing information, increase of cost associated with the operation (operation cost, increase of possibility of trouble due to work/setting error, increase of change frequency, enlargement and deterioration of visibility of routing information and the like) does not occur.

Further, for selecting a packet to be sent to the harmful packet removal apparatus, since it is possible to add information, located in any place on a packet, such as service type and source address of the packet in addition to the destination address as a condition, packets to be sent to the harmful packet removal apparatus can be limited when these pieces of information of an attack that is desired to be removed are known. This has an effect to decrease load of the harmful packet removal apparatus.

The present invention is not limited to the specifically disclosed embodiments, and variations and modifications may be made without departing from the scope of the present invention. For example, although the harmful packet removal apparatus is connected to the packet transfer apparatus in the present embodiments, it is not limited to the harmful packet removal apparatus, and any apparatus can be connected to the packet transfer apparatus.

The present international application claims priority based on Japanese patent application No. 2006-081588, filed in the JPO on Mar. 23, 2006 and the entire contents of the Japanese patent application No. 2006-081588 is incorporated herein by reference.

The invention claimed is:

1. A packet transfer apparatus for performing transfer of a packet that is received via a communication network, comprising:
 a plurality of network interfaces;
 a storage unit configured to store at least a predetermined search pattern that is data for identifying an attack target apparatus and an Ethernet address identifying a harmful packet removal apparatus;
 a determination unit configured to determine whether predetermined harmful packet removal data in a packet received from a network interface matches the search pattern;
 an output interface determination unit configured to determine a network interface for outputting the packet based on the determination result by the determination unit and the network interface from which the packet is received;
 an address replacement unit configured to replace an Ethernet address identifying a destination apparatus of the packet with an Ethernet address identifying the harmful packet removal apparatus when outputting the packet from a network interface connected to the harmful packet removal apparatus; and
 a packet sending unit configured to send the packet to the network interface determined by the output interface determination unit.

2. The packet transfer apparatus as claimed in claim 1, wherein, when the determination unit determines that the predetermined data in the packet matches the search pattern, the output interface determination unit determines to output the packet from a network interface connected to the harmful packet removal apparatus.

3. The packet transfer apparatus as claimed in claim 2, wherein, when receiving the packet from the harmful packet removal apparatus, the packet transfer apparatus outputs the packet from a network interface corresponding to a destination described in the packet without performing determination by the determination unit.

4. The packet transfer apparatus as claimed in any one of claims 1, 2, or 3, wherein, when the determination unit determines that the predetermined data in the packet does not match the search pattern, the output interface determination unit determines to output the packet from a predetermined network interface as corresponding to the network interface from which the packet is received.

5. A packet transfer method in which a packet transfer apparatus including a plurality of network interfaces and a storage unit configured to store at least a predetermined search pattern that is data for identifying an attack target apparatus and an Ethernet address identifying a harmful packet removal apparatus performs transfer of a packet that is received via a communication network, comprising:

a determination step of determining whether predetermined data in a packet received from a network interface matches the search pattern;

an output interface determination step of determining a network interface for outputting the packet based on the determination result in the determination step and the network interface from which the packet is received;

an address replacement step of replacing an Ethernet address identifying a destination apparatus of the packet with an Ethernet address identifying the harmful packet removal apparatus when outputting the packet from a network interface connected to the harmful packet removal apparatus; and a packet sending step of sending the packet to the network interface determined in the output interface determination step.

6. A non-transitory computer readable storage medium that stores a program, which when executed by a packet transfer apparatus including a plurality of network interfaces and a storage unit configured to store at least a predetermined search pattern that is data for identifying an attack target apparatus and an Ethernet address identifying a harmful packet removal apparatus causes the packet transfer apparatus to perform a method for performing transfer of a packet that is received via a communication network, the method comprising:

a determination step of determining whether predetermined data in a packet received from a network interface matches the search pattern;

an output interface determination step of determining a network interface for outputting the packet based on the determination result in the determination step and the network interface from which the packet is received;

an address replacement step of replacing an Ethernet address identifying a destination apparatus of the packet with an Ethernet address identifying the harmful packet removal apparatus when outputting the packet from a network interface connected to the harmful packet removal apparatus; and a packet sending step of sending the packet to the network interface determined in the output interface determination step.

* * * * *